April 14, 1931.

W. L. McGRATH

Re. 18,040

ENGINE STARTER

Original Filed Nov. 13, 1919 3 Sheets-Sheet 1

Witness
Martin H. Olsen

Inventor
William L. McGrath
By Rector, Hibben, Davis & Macauley
His Att'ys.

April 14, 1931. W. L. McGRATH Re. 18,040

ENGINE STARTER

Original Filed Nov. 13, 1919 3 Sheets-Sheet 2

Witness
Martin H. Olsen

Inventor
William L. McGrath
By Rector, Hibben Davis & Macauley,
His Attys

April 14, 1931. W. L. McGRATH Re. 18,040

ENGINE STARTER

Original Filed Nov. 13, 1919 3 Sheets-Sheet 3

Witness
Martin H. Olsen

Inventor
William L. McGrath
By Rector, Hibben, Davis & Macauley
His Attys.

Reissued Apr. 14, 1931

Re. 18,040

UNITED STATES PATENT OFFICE

WILLIAM L. McGRATH, OF ELMIRA, NEW YORK, ASSIGNOR TO ECLIPSE MACHINE COMPANY, OF ELMIRA, NEW YORK, A CORPORATION OF NEW YORK

ENGINE STARTER

Original No. 1,396,518, dated November 8, 1921, Serial No. 337,725, filed November 13, 1919. Application for reissue filed August 19, 1922. Serial No. 583,023.

My invention pertains to engine starters and relates more particularly to the drive or transmission portion thereof interposed between the prime mover such as an electric motor and a member of the engine to be started, such as the fly wheel thereof. The object of my invention is to provide a simple, efficient and reliable drive of a type characterized by the manual operation of the driving member of the drive for engagement or meshing with the fly wheel and by the automatic disengagement of such driving member when the engine has started on its own power.

Figures 1, 3:
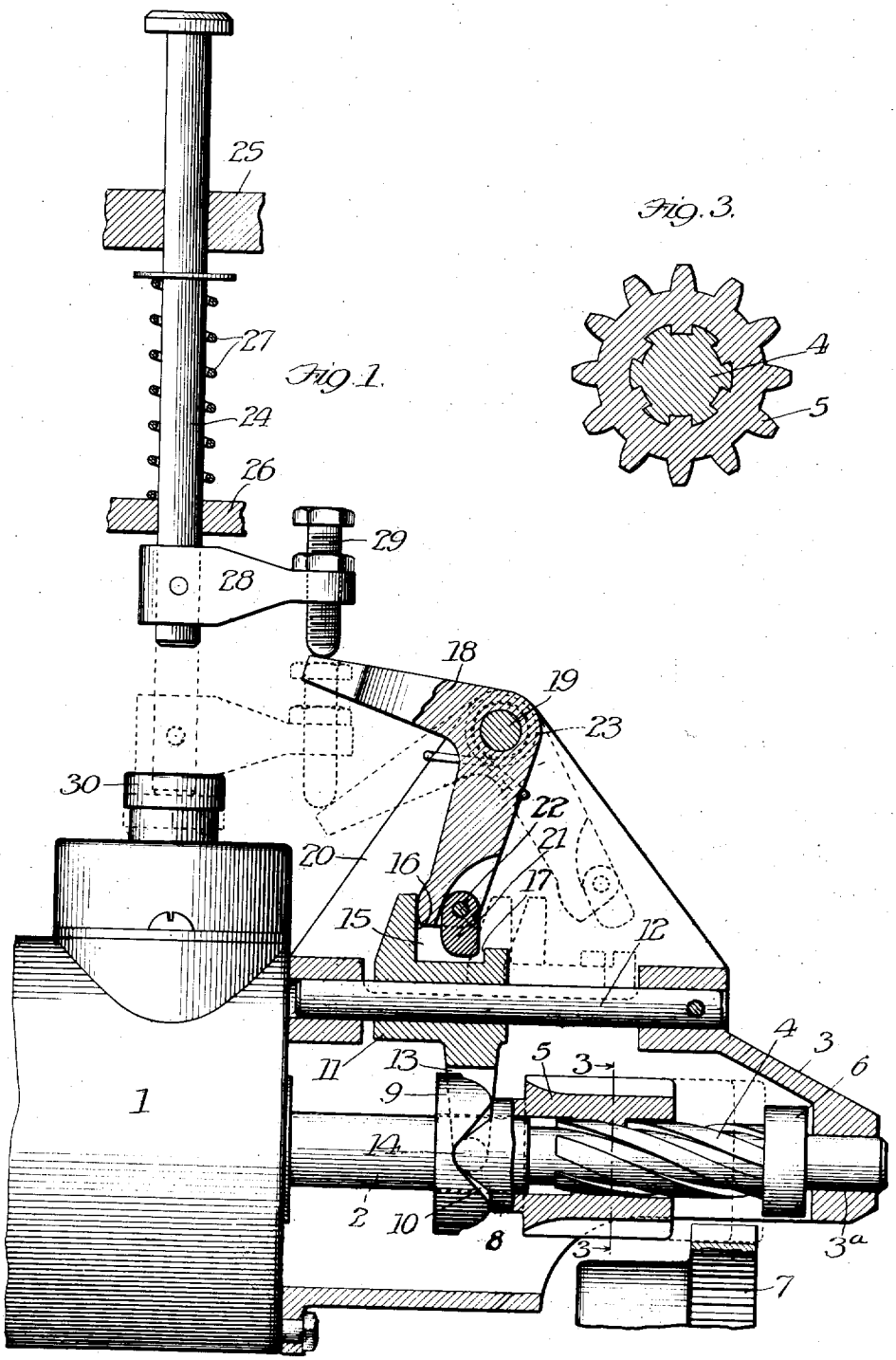
Figure 2:
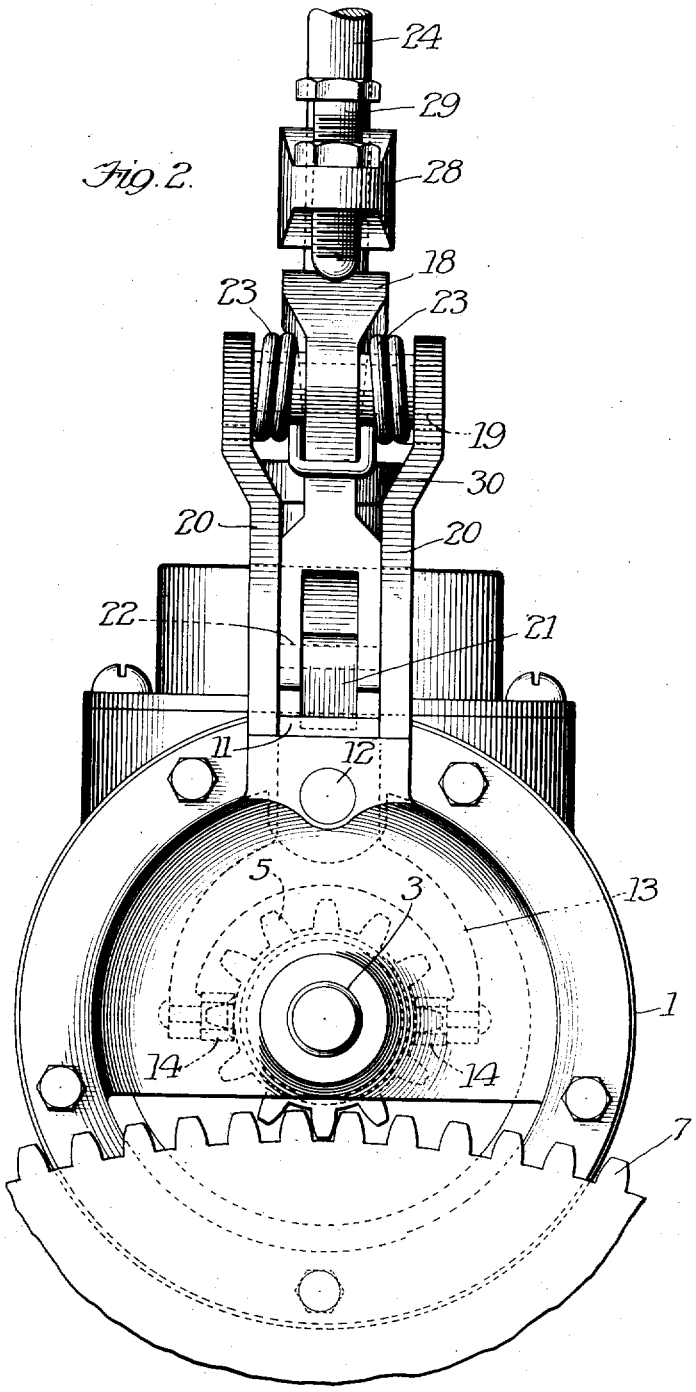

In the drawings Figure 1 is a sectional elevation of a starter system embodying my invention; Fig. 2 an end elevation thereof; Fig. 3 a section on the line 3—3 of Fig. 1; and Fig. 4 a sectional elevation of a modified form of construction.

For the purposes of a clear and definite description I have selected one of many embodiments of my invention, the same being here shown as of the single reduction type in which the drive is direct driven by the motor, although it may be indirectly driven, and may have other modifications and may partake of other forms without departing from the spirit of my invention.

As shown the starting motor 1 has an extended armature shaft 2 journaled at its outer end in a bearing 3[a] provided by the inclosing casing or bracket 3 which is secured to or supported by the motor frame. This rotatable or drive shaft 2 is provided intermediate its length with spiral splines 4.

The driving member is here in the form of a pinion 5 and is provided with a corresponding spiral splines in its central bore to coact with the splines of the shaft, with the result that the pinion is mounted thereon for longitudinal movement thereof and rotary movement therewith after its longitudinal movement has been arrested by contact with the stop nut 6, at which time the pinion is in engagement or mesh with the fly wheel 7. The pinion is provided with an inwardly extending sleeve or hub portion 8 terminating in a head 9 which is provided on its forward side with the irregular or cam surface 10, adapted to cooperate with the rolls of the shifting fork hereinafter described.

The means for shifting the pinion which are operated by hand or foot as desired, consists of a depressible plunger and lever connections and shifter interposed between it and the pinion head. The shifter consists of a sleeve 11 mounted to slide on a shaft or rod 12 suitably mounted in the casing 3. This sleeve is provided with the fork or bifurcated arms 13 carrying at their lower ends rolls 14 adapted to cooperate with the track or irregular surface 10 of the pinion head. The upper outer corner of this sleeve 11 is shaped to form a recess 15 with a high shoulder or side 16 and a low shoulder or side 17.

The lever connections for shifting the sleeve 11 consists of a bell crank 18 pivoted at 19 at the upper end of the vertical bracket arms 20 rising from the top of the casing 3. The lower or vertical arm of the bell crank enters within the recess 15 and is provided at its lower outer corner with a small finger 21 pivoted thereto at 22. The bell crank is held in its normal position illustrated by a yielding pressure which is here afforded by means of the torsion spring 23 encircling the pivot pin 19 and connected at its ends with an arm 20 and with the bell crank with the result that any movement of such bell crank in an anticlockwise direction is resisted by the spring.

The upper or horizontal arm of the bell crank is operated by the vertical plunger 24 passing through and guided by suitable supports such as the floor board 25 of an automobile, and by a horizontal plate 26 therebelow. This plunger is normally held in the position shown by the coiled spring 27, and such plunger carries at its lower end a lateral arm 28 which is provided at its outer end with an adjustable screw 29 adapted to contact and operate the bell crank.

The plunger 24 is in vertical alinement with a movable element of a switch 30, here shown as attached to the motor frame and adapted to control the electrical circuit of the motor.

Describing a cycle of operation and beginning with the parts in their normal position shown in Fig. 1, depression of the plunger 24 by hand or foot will oscillate the bell crank to the first dotted line position, with the result that the finger 21 will engage the shoulder 17 and then move the sleeve longitudinally along its supporting shaft 12. The fork or arms 13 will thereupon shift the pinion to the right into engagement with the fly wheel. In this movement the pinion is rotated slightly by reason of the splines. The construction and arrangement may be such that full mesh of the pinion may be established by hand or only a partial mesh, after which the starting motor when operated will establish full mesh and subsequent rotation of the pinion and the fly wheel. When the plunger has substantially reached its lower limit of depression it will contact and operate the switch 30, whereupon the motor will be operated and the drive shaft 2 rotated, with the result that the pinion 5 if not in full mesh is automatically brought into full mesh and the fly wheel rotated. When the engine has started on its own power the pinion will be automatically demeshed in the well-known manner. In this operation the torsion spring 23 will return the bell crank and the sleeve 11 to normal position, the pivoted finger 21 riding over the outer corner of such sleeve and then taking its position with the lower end of the bell crank arm within the recess 15. This finger is provided to enable the reengagement of the bell crank with such recess after the pinion has been demeshed through the starting of the engine before the manual release of the bell crank. The first set of dotted lines represents the position of the sleeve 11 at the time of partial mesh, and the second or outermost set to the right representing the position of such sleeve when in full mesh.

In the event that the meshing operation is not perfect, as when the teeth of the pinion and fly wheel abut end to end, the movement of the plunger will thereby be stopped before contacting the starting switch 30. On releasing the plunger the torsion spring on the bell crank will withdraw the pinion through the shifting fork, the rolls of the latter contacting the irregular surface 10. Should this contact occur at the bottom of such cam surface as indicated in the drawing, it will prevent the turning of the pinion during retraction and will cause a slight turning of the shaft. Should the contact occur at a point other than the bottom of the irregular surface, it will cause the turning of the pinion and of course the shaft therewith. In either case, the next attempt at starting will then cause a different registration of the teeth and meshing will be accomplished.

Figure 4:
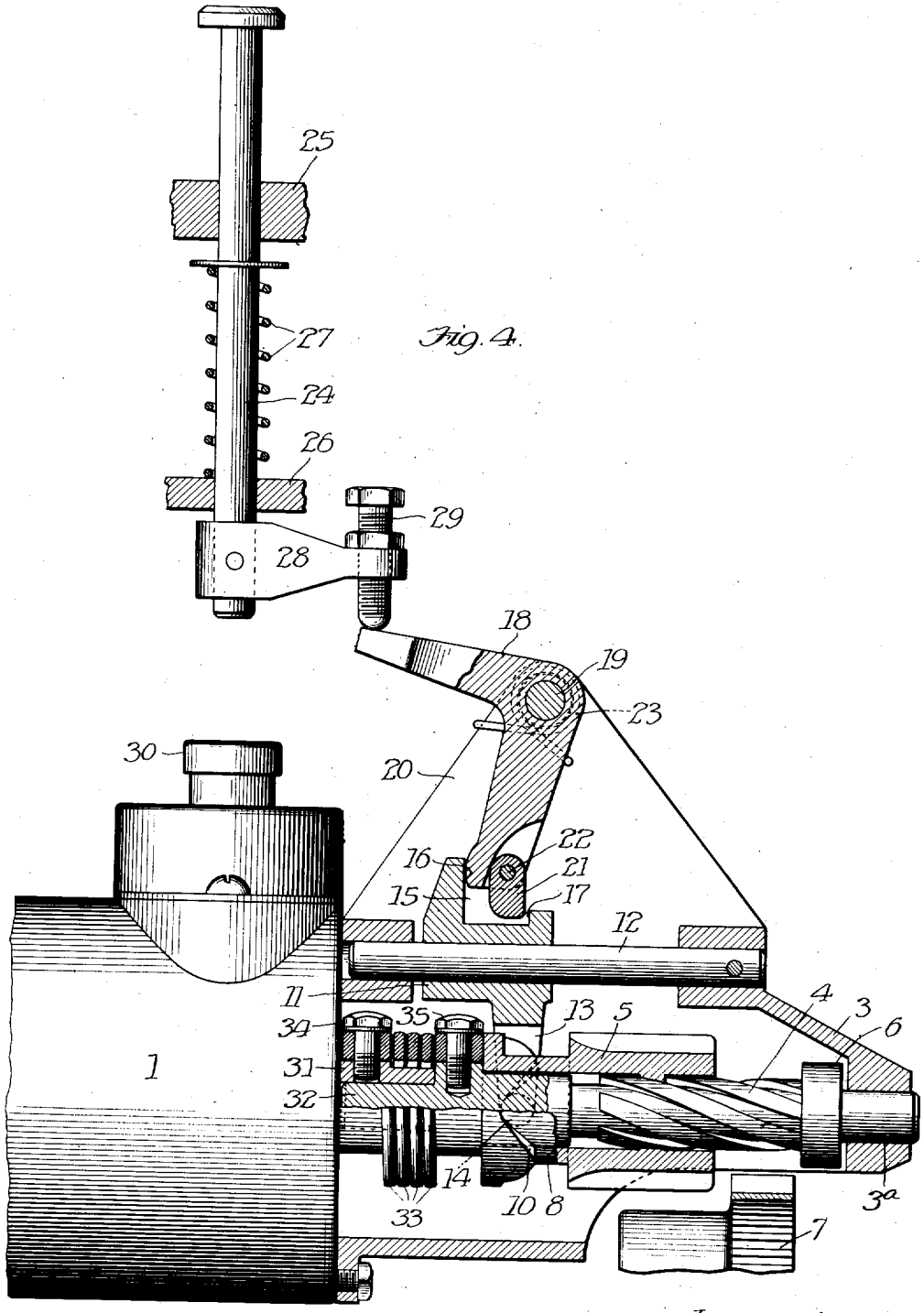

In Fig. 4 I have illustrated a modified form of construction which differs from the one already described in the provision of a yielding driving connection between the driving shaft and the pinion. According to this construction the drive shaft 31 of the motor is a short hollow stub shaft adapted to receive the inner end of the rotatable shaft 32 of the drive. These two shafts are operatively connected by a yielding driving connection which is here a coiled driving spring 33 connected at its opposite ends to the two shafts 31 and 32 by means of the studs 34 and 35, respectively. The pinion 5 is the same in construction and operation as that already described, and is mounted upon the drive shaft 32 in the same manner as the other pinion was mounted upon the drive shaft 2.

The shifter means are manually or pedally operable which for convenience I have herein designated as manual operation, as distinguished from power or from automatic operation.

I claim:—

1. An engine starter drive including a rotatable shaft, a driving member mounted thereon for rotary movement therewith and for longitudinal movement thereof to engage a part of the engine to be started, and means adapted to cause such longitudinal movement of the driving member and to retract the same and also to cause a slight rotary movement thereof on its retracting movement away from such engine part.

2. An engine starter drive including a rotatable shaft, a driving member mounted thereon for rotary movement therewith and for longitudinal movement thereof to engage a part of the engine to be started, and means adapted to cause such longitudinal movement of the driving member and to retract the same, said means and driving member having elements cooperating with each other on the retracting movement of such member away from such engine part to cause a slight rotary movement thereof.

3. An engine starter drive including a rotatable shaft, a driving member mounted thereon for rotary movement therewith and for longitudinal movement thereof to engage a part of the engine to be started, and having a cam face thereon, and manually operated means adapted to cause such longitudinal movement of the driving member and to retract the same such means cooperating with such cam face on the retracting movement thereof away from such engine part to cause a slight rotary movement thereof.

4. An engine starter drive including a rotatable shaft, a driving member mounted thereon for rotary movement therewith and for longitudinal movement thereof to engage a part of the engine to be started, and having a cam face thereon, and means adapted to cause such longitudinal movement of the driving member, and including a shifter having rolls adapted to cooperate with such cam face on the retracting movement of the driving member whereby the latter is caused to rotate slightly.

5. An engine starter drive including a rotatable shaft, a driving member mounted thereon for rotary movement therewith and for longitudinal movement thereof to engage a part of the engine to be started, and having at one end a sleeve extension terminating in a head provided on its inner side with a cam face, and a shifter adapted when moved in one direction to shift the driving member longitudinally and to engage the cam face on its return movement to cause a slight rotary movement of the driving member.

6. An engine starter drive including a rotatable shaft, a driving member mounted thereon for rotary movement therewith and for longitudinal movement thereof to engage a part of the engine to be started, said shaft and member having corresponding spiral splines, and means acting on the driving member and adapted to cause such longitudinal movement thereof, and to cause a slight rotary movement thereof on its retracting movement away from such engine part.

7. An engine starter drive including a rotatable shaft, a driving member mounted thereon for rotary movement therewith and for longitudinal movement thereof to engage a part of the engine to be started, said shaft and member having corresponding spiral splines, and means acting on the driving member and adapted to cause such longitudinal movement thereof, and to cause a slight rotary movement thereof on its retracting movement away from such engine part, said means being manually operated.

8. An engine starter drive including a rotatable shaft, a driving member mounted thereon for rotary movement therewith and for longitudinal movement thereof to engage a part of the engine to be started, and means for shifting the driving member comprising a supporting shaft arranged parallel to the rotatable shaft, a shifter mounted to slide on the supporting shaft and having arms operatively connected with the driving member, and a lever operatively connected with the shifter for shifting it a predetermined distance but adapted to detach itself therefrom for the remainder of the distance, and to reengage therewith when returned to normal position.

9. An engine starter drive including a rotatable shaft, a driving member mounted thereon for rotary movement therewith and for longitudinal movement thereof to engage a part of the engine to be started, and means for shifting the driving member comprising a supporting shaft arranged parallel to the rotatable shaft, a shifter mounted to slide on the supporting shaft and having arms operatively connected with the driving member, and a lever operatively connected with the shifter for shifting it a predetermined distance but adapted to detach itself therefrom for the remainder of the distance, and to reengage therewith when returned to normal position, said shifter being pressed to normal position with a yielding pressure and acting on the driving member to restore it to normal position.

10. An engine starter drive including a rotatable shaft, a driving member mounted thereon for rotary movement therewith and for longitudinal movement thereof to engage a part of the engine to be started, and means for shifting the driving member comprising a supporting shaft, arranged parallel to the rotatable shaft, a shifter mounted to slide on the supporting shaft and having arms operatively connected with the driving member, and a lever operatively connected with the shifter for shifting it a predetermined distance but adapted to detach itself therefrom for the remainder of the distance, and to reengage therewith when returned to normal position, and a spring acting on the lever to hold the same and the shifter and also the driving member in a normal position.

11. An engine starter drive including a rotatable shaft, a driving member mounted thereon for rotary movement therewith and for longitudinal movement thereof to engage a part of the engine to be started, and means for shifting the driving member comprising a supporting shaft arranged parallel to the rotatable shaft, a shifter mounted to slide on the supporting shaft and having arms operatively connected with the driving member, said shifter having a recess, a lever having one end normally positioned in such recess and bearing against the shifter to hold it in normal position and having a pivoted finger on such end and adapted to cooperate with the recess to move the shifter a predetermined distance and then clear the recess and subsequently return thereunto and a single means for restoring the parts to normal position.

12. An engine starter drive including a rotatable shaft, a driving member mounted thereon for rotary movement therewith and for longitudinal movement thereof to engage a part of the engine to be started, and means for shifting the driving member comprising a supporting shaft arranged parallel to the rotatable shaft, a shifter mounted to slide on the supporting shaft and having arms operatively connected with the driving member and normally bearing thereagainst with a yielding pressure, a bell crank having one arm operatively connected with the shifter, and a manually operated plunger for actuating the bell crank.

13. An engine starter drive including a rotatable shaft, a driving member mounted thereon for longitudinal movement thereof to engage a part of the engine to be started and rotary movement therewith, and means adapted to cause such longitudinal movement of the driving member and to retract the same and also to cause a slight rotary movement thereof on its retracting movement away from the engine part, a driving shaft, and a yielding driving connection between the two shafts.

14. An engine starter drive including a rotatable shaft, a driving member mounted thereon for longitudinal movement thereof to engage a part of the engine to be started and rotary movement therewith, and means adapted to cause such longitudinal movement of the driving member and to retract the same and also to cause a slight rotary movement thereof on its retracting movement away from the engine part, a driving shaft, and a spring drive between the two shafts.

15. An engine starter drive including, in combination with an electric starting motor and with an electrical switch therefor, and with a source of electrical energy, a rotatable shaft operated by the motor, a driving member mounted thereon for longitudinal movement thereof to engage a part of the engine to be started and for rotary movement therewith, said member and shaft having cooperating means for causing longitudinal advancement of such member when the shaft is rotated, manually operated means for shifting said driving member longitudinally into engagement with the engine member, and means for operating the switch to rotate the motor by directly connecting the motor and said source of energy prior to full engagement between the driving member and the engine member.

16. An engine starter drive including, in combination with an electric starting motor and with an electrical switch therefor, and with a source of electrical energy, a rotatable shaft operated by the motor, a driving member mounted thereon for longitudinal movement thereof to engage a part of the engine to be started and for rotary movement therewith, said member and shaft having cooperating means for causing longitudinal advancement of such member when the shaft is rotated, manually operated means for shifting said driving member longitudinally into engagement with the engine member, an operating connection between said shaft and motor including a yielding driving connection, and means for operating the switch to rotate the motor by directly connecting the motor and said source of energy prior to full engagement between the driving member and the engine member.

17. An engine starter drive including, in combination with an electric starting motor and with an electrical switch therefor, and with a source of electrical energy, a rotatable shaft operated by the motor, a driving member mounted thereon for longitudinal movement thereof to engage a part of the engine to be started and for rotary movement therewith, said member and shaft having cooperating means for causing longitudinal advancement of such member when the shaft is rotated, manually operated means for shifting said driving member longitudinally into engagement with the engine member, an operating connection between said shaft and motor including a drive spring through which the torque is transmitted, and means for operating the switch to rotate the motor by directly connecting the motor and said source of energy prior to full engagement between the driving member and the engine member.

18. An engine starter drive including, in combination with an electric starting motor and with an electrical switch therefor, a rotatable screw shaft, a pinion threaded thereon for longitudinal movement thereof to engage a part of the engine to be started, and for rotary movement therewith, manually operated means for shifting said pinion longitudinally into engagement with the engine member, a driving connection between the motor and the shaft, and means for operating the switch to rotate the motor, said parts being so constructed and timed that the motor will be rotated and permitted to accelerate before the pinion is fully engaged with the engine member.

19. An engine starter drive including, in combination with an electric starting motor and with an electrical switch therefor, a rotatable screw shaft, a pinion threaded thereon for longitudinal movement thereof to engage a part of the engine to be started, and for rotary movement therewith, manually operated means for shifting said pinion longitudinally into engagement with the engine member, a driving connection between the motor and the shaft, and means for operating the switch to rotate the motor, said parts being so constructed and timed that the motor will be started rotating when the pinion is partially engaged with the engine member and will be accelerated before the pinion is fully engaged therewith.

20. An engine starter drive including, in combination with an electric starting motor and with an electrical switch therefor, a rotatable screw shaft, a pinion threaded thereon for longitudinal movement thereof to engage a part of the engine to be started, and for rotary movement therewith, manually operated means for shifting said pinion longitudinally into engagement with the engine member, a yielding driving connection comprising a coiled spring located between the motor and the shaft, and means for operating the switch to rotate the motor, said parts being so constructed and timed that the motor will be rotated without load and be thereby permitted to accelerate before the pinion is fully engaged with the engine member.

21. An engine starter drive including, in combination with an electric starting motor and with a switch therefor, a rotatable shaft operated by the motor, a driving member mounted thereon for longitudinal movement thereof to engage a member of the engine to be started and for rotary movement therewith, said member and shaft having cooperating means for causing longitudinal advancement of such member when the shaft is rotated, manually operated means for shifting said driving member longitudinally into engagement with the engine member, an operating connection between said shaft and motor including means automatically yieldable in conformity with the resistance to rotation for gradually building up torque to overcome said resistance, and means for operating the switch to rotate the motor prior to full engagement between the driving member and the engine member.

22. An engine starter drive including a motor driven rotatable shaft, a driving member mounted thereon for longitudinal movement thereof to engage a member of the engine to be started and for rotary movement therewith, manually operated means for shifting said driving member longitudinally into engagement with the engine member, means outside the line of transmission of starting torque for rotating such driving member to a position for the engagement of the driving member and the engine member in the event of non-register of their engaging parts, and means actuated by the rotation of the shaft for assuring or completing full engagement with the engine member and for automatically disengaging the driving member from the engine member when the engine operates under its own power.

23. An engine starter drive including a motor driven rotatable shaft, a driving member mounted thereon for longitudinal movement thereof to engage a member of the engine to be started and for rotary movement therewith, manually operated means for shifting said driving member longitudinally into engagement with the engine member, means outside the line of transmission of starting torque for rotating such driving member to a position for the engagement of the driving member and the engine member in the event of non-register of their engaging parts, and screw thread means actuated by the rotation of the shaft for assuring or completing full engagement with the engine member and for automatically disengaging the driving member from the engine member when the engine operates under its own power.

24. An engine starter drive including a rotatable shaft, a pinion threaded thereon for longitudinal movement thereof in one direction to engage a member of the engine to be started and for rotary movement therewith and also for longitudinal movement in the opposite direction automatically by reason of the threaded connection between such shaft and pinion to cause disengagement of the latter from the engine member when the engine operates under its own power, said driving member being in the form of a pinion having a portion at one end provided with irregularities, and manually operable mechanism cooperating with said portion of the pinion to so move such pinion longitudinally to engage the engine member and to turn it angularly to a position to avoid abutting of the pinion and engine member.

25. An engine starter drive including a motor-driven shaft, a driving member mounted thereon for longitudinal movement thereof to engage a member of the engine to be started, manually operable means for shifting said driving member longitudinally into engagement with said engine member, means controlled by said manually operable means and outside the line of transmission of starting torque for rotating such driving member to a position for the engagement of said driving member and said engine member in the event of non-register of their engaging parts, and structure in operative association with said shaft and driving member for occasioning rotary movement of said driving member with said shaft to start the engine and for effecting disengagement of said driving member from said engine member, automatically and independently of the operation of said manually operable means, when the engine operates under its own power.

26. An engine starter drive including, in combination, a starting motor, starting means for said motor, a motor-driven rotatable shaft, a driving member having provision to mesh with an engine part to be started and mounted on said shaft for movement longitudinally thereof to effect meshing engagement, manually operable means operatively associated with said driving member to move it longitudinally toward meshing position and operatively associated with said motor starter to actuate it but only after moving said driving member into said meshing engagement, mechanical means operatively associated with said manually-operable means to receive power therefrom and operatively associated with said driving member to rotatively displace it for finding registry of said driving member with said engine part to permit meshing to occur, and means for effecting rotary movement of said driving member with said shaft to start the engine and for automatically effecting disengagement of said driving member from said engine part when the engine operates under its own power.

27. An engine starter drive including, in combination, a starting motor, starting means for said motor, a motor driven rotatable shaft, a driving member having provision to mesh with an engine part to be started and mounted on said shaft for longitudinal movement thereof to effect the meshing engagement, manually operable means operatively associated with said driving member to move it longitudinally toward meshing position and adapted and arranged to be disconnected from said driving member when the latter is in such engagement, said manually operable means being operatively associated with said motor starter to actuate it but only after moving said driving member into said meshing engagement, mechanical means operatively associated with said manually operable means to receive power therefrom and operatively associated with said driving member to rotatively displace it for finding registry thereof with said engine part to permit meshing to occur, said driving member being free to retain any position to which it is moved by the manually operable means before the engine or motor be started, and means for rotating said driving member with said shaft to start the engine and for automatically effecting disengagement of said driving member from said engine part when the engine operates under its own power.

28. An engine starter drive including, in combination, an electric starting motor, a motor starting switch for initial full energization of the motor, a rotatable motor-driven shaft, a driving member having provision to mesh with an engine part to be started and mounted on said shaft for movement longitudinally thereof to effect meshing engagement, manually operable means operatively associated with said driving member to move it longitudinally toward meshing position and operatively associated with said switch to actuate it but only after moving said driving member into said meshing engagement, mechanical means operatively associated with said manually-operable means to receive power therefrom and operatively associated with said driving member to rotatively displace it for finding registry of said driving member with said engine part to permit meshing to occur, and means for effecting rotary movement of said driving member with said shaft to start the engine and for automatically effecting disengagement of said driving member from said engine part when the engine operates under its own power.

WILLIAM L. McGRATH.